US012699015B2

(12) United States Patent
Ogasa et al.

(10) Patent No.: US 12,699,015 B2
(45) Date of Patent: Aug. 4, 2026

(54) STRAIN GAUGE

(71) Applicant: MINEBEA MITSUMI Inc., Nagano (JP)

(72) Inventors: Yosuke Ogasa, Nagano (JP); Toshiaki Asakawa, Nagano (JP); Atsushi Kitamura, Nagano (JP); Shigeyuki Adachi, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 293 days.

(21) Appl. No.: 18/566,806

(22) PCT Filed: Mar. 24, 2022

(86) PCT No.: PCT/JP2022/014158
§ 371 (c)(1),
(2) Date: Dec. 4, 2023

(87) PCT Pub. No.: WO2022/259703
PCT Pub. Date: Dec. 15, 2022

(65) Prior Publication Data
US 2024/0369429 A1      Nov. 7, 2024

(30) Foreign Application Priority Data

Jun. 8, 2021      (JP) ................................ 2021-095633

(51) Int. Cl.
*G01L 1/22*          (2006.01)
*G01B 7/16*          (2006.01)
(52) U.S. Cl.
CPC .............. *G01L 1/2287* (2013.01); *G01B 7/16* (2013.01)

(58) Field of Classification Search
CPC ................................ G01L 1/2287; G01B 7/16
See application file for complete search history.

(56) References Cited

U.S. PATENT DOCUMENTS

| | | | |
|---|---|---|---|
| 4,342,217 A | 8/1982 | Paetow | |
| 11,326,967 B2 * | 5/2022 | Toda ........................ | G01B 7/18 |
| 2018/0023942 A1 | 1/2018 | Tata et al. | |
| 2020/0393311 A1 * | 12/2020 | Aizawa ................ | G01L 1/2287 |
| 2022/0390301 A1 | 12/2022 | Sato | |

(Continued)

FOREIGN PATENT DOCUMENTS

| | | | |
|---|---|---|---|
| JP | 2014-035239 | | 2/2014 |
| JP | 2014035239 A | * | 2/2014 |
| JP | 2016-074934 | | 5/2016 |

(Continued)

OTHER PUBLICATIONS

International Search Report for PCT/JP2022/014158 mailed on Jun. 14, 2022.

(Continued)

*Primary Examiner* — Jamel E Williams
(74) *Attorney, Agent, or Firm* — IPUSA, PLLC

(57)          ABSTRACT

According to the present disclosure, a strain gauge includes: a flexible substrate; and a resistor formed of a film containing Cr, CrN, and $Cr_2N$, on the substrate, and, in this strain gauge, the strain gauge is attached to a measurement object such that a grid direction of the resistor is orthogonal to a strain direction of the measurement object.

14 Claims, 8 Drawing Sheets

(56)     References Cited

U.S. PATENT DOCUMENTS

2023/0175831  A1      6/2023   Kitamura et al.

FOREIGN PATENT DOCUMENTS

| JP | 2017-150931 | | | 8/2017 | | |
|----|-------------|---|---|--------|---|----|
| JP | 2017150931 | A | * | 8/2017 | ............... | G01L 1/18 |
| JP | 2019090723 | A | * | 6/2019 | ............... | G01B 7/16 |
| JP | 2020-173271 | | | 10/2020 | | |
| JP | 2021-056149 | | | 4/2021 | | |
| JP | 2021056149 | A | * | 4/2021 | ........... | G01L 1/2287 |
| JP | 2021-076518 | | | 5/2021 | | |
| WO | 2021/205981 | | | 10/2021 | | |

OTHER PUBLICATIONS

Office Action mailed on Oct. 22, 2024 with respect to the corresponding Japanese patent application No. 2021-095633.

* cited by examiner

FIG.7

STRAIN GAUGE

TECHNICAL FIELD

The present disclosure relates to a strain gauge.

BACKGROUND ART

There is known a strain gauge that is attached to a measurement object and detects the strain of the measurement object. The strain gauge has a resistor for detecting strain, and the resistor is formed, for example, on insulating resin. The resistor is connected to an electrode via a conductive trace, for example (see Patent Document 1, for example).

CITATION LIST

Patent Document

Patent Document 1: Japanese Unexamined Patent Application Publication No. 2016-74934

SUMMARY OF THE INVENTION

Problem to be Solved by the Invention

A strain gauge is attached to a strain-generating body, and, by expanding and contracting in conjunction with the movement of the strain-generating body, detects the amount of strain of the strain-generating body. Therefore, in order to detect a larger amount of strain, the strain gauge itself must not be damaged during the process of expansion and contraction, and needs to have higher anti-strain characteristics.

The present disclosure has been prepared in view of the foregoing, and an object of the present disclosure is therefore to provide a strain gauge with improved anti-strain characteristics.

Means for Solving the Problem

According to the present disclosure, a strain gauge includes: a flexible substrate; and a resistor formed of a film containing Cr, CrN, and $Cr_2N$, on the substrate, and, in this strain gauge, the strain gauge is attached to a measurement object such that a grid direction of the resistor is orthogonal to a strain direction of the measurement object.

Advantageous Effects of the Invention

According to the technique disclosed herein, it is possible to provide a strain gauge with improved anti-strain characteristics.

BRIEF DESCRIPTION OF THE DRAWINGS

FIG. 7 is a diagram (example 2) for explaining the direction in which the strain gauge is attached;

DETAILED DESCRIPTION OF THE INVENTION

Now, an embodiment of the present disclosure will be described reference to the below with accompanying drawings. In each drawing, the same components will be assigned the same reference signs and may in some cases not be described in a redundant manner.

First Embodiment

Figure 1:
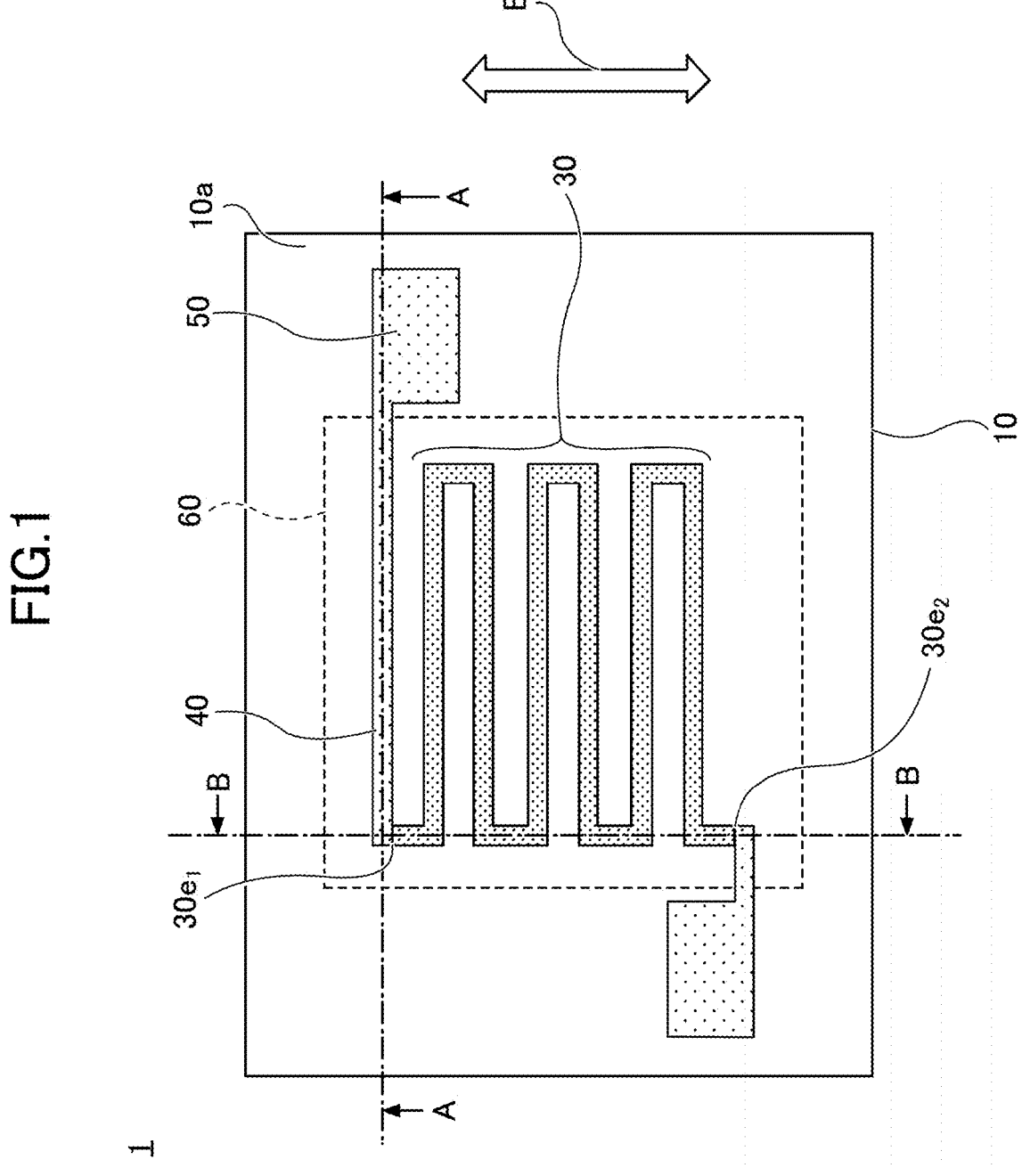
FIG. 1 is a plan view of an example of a strain gauge according to a first embodiment.
Figure 2:
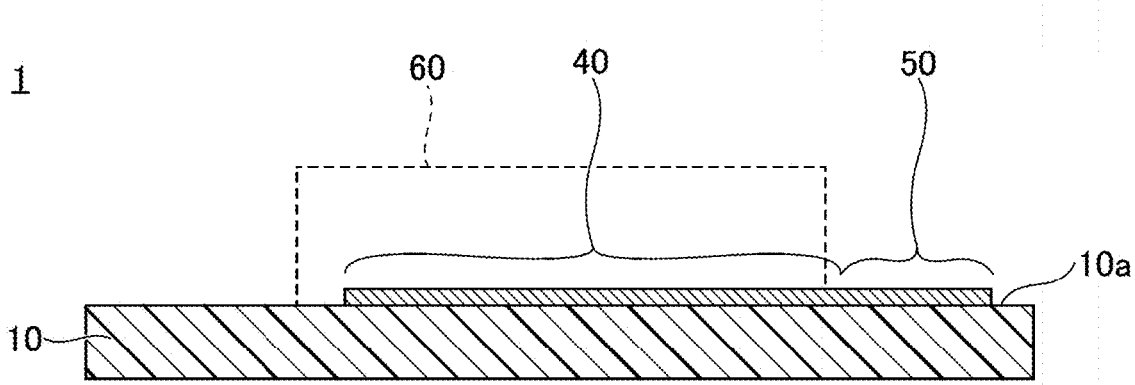
FIG. 2 is a cross-sectional view (example 1) that illustrates an example of the strain gauge according to the first embodiment.
Figure 3:
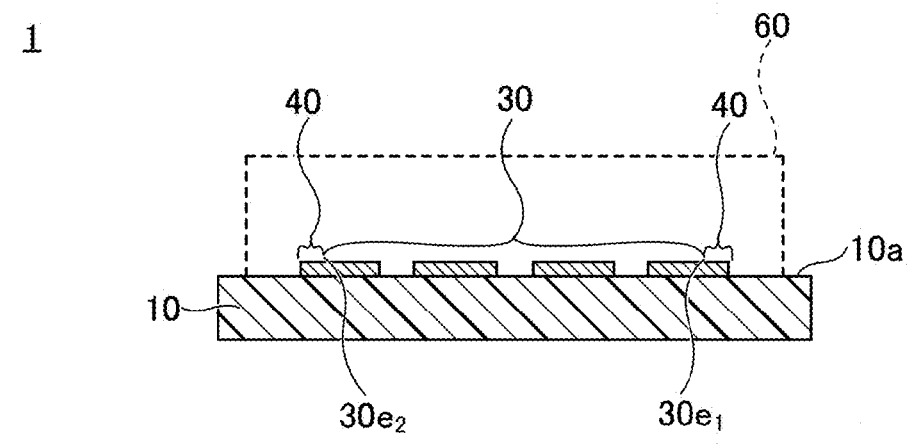
FIG. 3 is a cross-sectional view (example 2) that illustrates an example of the strain gauge according to the first embodiment.

FIG. 1 is a plan view that illustrates a strain gauge according to a first embodiment. FIG. 2 is a cross-sectional view (example 1) that illustrates the strain gauge according to the first embodiment, showing a cross-section along line A-A in FIG. 1. FIG. 3 is a cross-sectional view (example 2) that illustrates the strain gauge according to the first embodiment, showing a cross-section along line B-B in FIG. 1. Note that the arrow E shown in FIG. 1 indicates the strain direction (the direction of expansion/contraction) of the measurement object to which the strain gauge 1 is attached.

Referring to FIG. 1 to FIG. 3, the strain gauge 1 includes a substrate 10, a resistor 30, a conductive trace 40, electrodes 50, and a cover layer 60. Note that, in FIG. 1 to FIG. 3, only the outer edges of the cover layer 60 are shown with broken lines for ease of explanation. Note that the cover layer 60 may be provided if necessary.

Note that, with the present embodiment, for ease of explanation, the side of the substrate 10 in the strain gauge 1 on which the resistor 30 is provided will be referred to as the upper side or one side, and the side of the substrate 10 on which the resistor 30 is not provided will be referred to as the lower side or the other side. Furthermore, in each component or part, the surface on the side where the resistor 30 is provided will be referred to as one surface or the upper surface, and the surface on the side where the resistor 30 is not provided will be referred to as the other surface or the lower surface. However, the strain gauge 1 can be used upside down, or can be disposed at any angle. Furthermore, a plan view herein means that an object is viewed from a direction normal to an upper surface 10a of the substrate 10, and a plan shape herein refers to the shape of an object viewed from a direction normal to the upper surface 10a of the substrate 10.

The substrate 10 is a member that serves as a foundation layer when forming the resistor 30 and the like, and is flexible. The thickness of the substrate 10 is not particularly limited and can be selected in accordance with the purpose of use. For example, the substrate 10 may be approximately 5 micrometers (μm) to 500 μm thick. In particular, it is preferable if the substrate 10 is 5 μm to 200 μm thick, because the transmission of strain from the surface of the strain generating body joined with the lower surface of the substrate 10 via a bonding layer or the like, the dimensional stability in the environment, and so forth are excellent. It is even more preferable if the substrate is 10 μm thick or more because the insulation is excellent.

The substrate 10 can be formed from an insulating resin film made of, for example, a polyimide (PI) resin, an epoxy resin, a polyether ether ketone (PEEK) resin, a polyethylene naphthalate (PEN) resin, a polyethylene terephthalate (PET) resin, a polyphenylene sulfide (PPS) resin, a liquid crystal polymer (LCP) resin, a polyolefin resin, and so forth. Note that a film herein refers to a flexible member that is approximately 500 μm thick or less.

Here, saying that "the substrate 10 can be formed from an insulating resin film" by no means precludes the substrate 10 from containing fillers, impurities, and so forth, in the insulating resin film. The substrate 10 may be formed from, for example, an insulating resin film that contains fillers such as silica or alumina.

Examples of materials of the substrate 10 other than resin include crystalline materials such as $SiO_2$, $ZrO_2$ (including YSZ), Si, $Si_2N_3$, $Al_2O_3$ (including sapphire), ZnO, perovskite ceramics ($CaTiO_3$, $BaTiO_3$, etc.) and so forth. Furthermore, additional examples may include amorphous glass and the like. Furthermore, as materials of the substrate 10, metals such as aluminum, an aluminum alloy (duralumin), titanium, and others may be used. In this case, for example, an insulating film is formed on this metallic substrate 10.

The resistor 30 is a thin film formed on the substrate 10 in a predetermined pattern, and is a sensitive part that changes its resistance in response to strain. The resistor 30 may be formed directly on the upper surface 10a of the substrate 10, or may be formed on the upper surface 10a of the substrate 10 via other layers. Note that, in FIG. 1, the resistor 30 is shown with a dark satin pattern for ease of explanation.

The resistor 30 has a plurality of elongated parts that are arranged at predetermined intervals with their longitudinal directions oriented in the same direction (the direction of line A-A in FIG. 1), and the ends of adjacent elongated parts are connected alternately so as to form a zigzag structure on the whole. The longitudinal direction of the elongated parts is the grid direction, and the direction perpendicular to the grid direction is the grid width direction (the direction of line B-B in FIG. 1). The strain gauge 1 is attached to the measurement object such that the grid direction of the resistor 30 is orthogonal to the strain direction E of the measurement object.

Ends of the two elongated parts in the longitudinal direction, located on the outermost side in the grid width direction, are bent in the grid width direction, and form respective ends 30e₁ and 30e₂ of the resistor 30 in the grid width direction. The ends 30e₁ and 30e₂ of the resistor 30 in the grid width direction are electrically connected with the electrodes 50 via the conductive traces 40. In other words, the conductive traces 40 electrically connect the ends 30e₁ and 30e₂ of the resistor 30 in the grid width direction, with respective electrodes 50.

The resistor 30 can be formed from, for example, a material containing Cr (chromium), a material containing Ni (nickel), or a material containing both Cr and Ni. That is, the resistor 30 can be formed from a material containing at least one of Cr and Ni. Materials containing Cr include, for example, a Cr composite film. Materials containing Ni include, for example, Cu—Ni (copper nickel). Materials containing both Cr and Ni include, for example, NiCr (nickel chromium).

Here, a Cr composite film refers to a composite film of Cr, CrN, $Cr_2N$, and the like. A Cr composite film may contain incidental impurities such as chromium oxide.

The thickness of the resistor 30 is not particularly limited and can be selected in accordance with the purpose of use. The resistor 30 can be, for example, approximately 0.05 μm to 2 μm thick. In particular, it is preferable if the resistor 30 is 0.1 μm thick or more, because the crystallinity of crystals (for example, the crystallinity of α-Cr) constituting the resistor 30 improves. It is even more preferable if the resistor 30 is 1 μm thick or less, because the cracks in the film constituting the resistor 30 due to the film's internal stress, the warping of the film from the substrate 10, and so forth can be reduced. The width of the resistor 30 can be optimized in accordance with the specifications required, such as the resistance value and the lateral sensitivity, and can be set to, for example, approximately 10 μm to 100 μm in consideration of countermeasures for wire breaks.

For example, if the resistor 30 is a Cr composite film, the stability of gauge characteristics can be improved by using α-Cr (alpha-chromium), which has a stable crystalline phase, as a main component. Additionally, when the resistor 30 contains α-Cr as its main component, the strain gauge 1 can have a gauge factor of 10 or higher, as well as a gauge factor temperature coefficient TCS and a resistance temperature coefficient TCR in a range of −1,000 ppm/degrees Celsius to +1,000 ppm/degrees Celsius. Here, "the main component" means that the substance of interest takes up 50 percent (%) or more by weight of all the substances constituting the resistor. It is preferable if the resistor 30 contains 80% or more of α-Cr by weight thereof, and more preferable if the resistor 30 contains 90% or more of α-Cr by weight thereof, from the perspective of improving the gauge characteristics. Note that α-Cr is a Cr having a bcc structure (body-centered cubic structure).

Also, when the resistor 30 is a Cr composite film, the CrN and $Cr_2N$ contained in the Cr composite film are preferably 20% or less by weight of the Cr composite film. When the CrN and $Cr_2N$ contained in the Cr composite film are 20% or less by weight of the Cr composite film, the decrease in the gauge factor can be reduced.

Furthermore, the proportion of $Cr_2N$ in CrN and $Cr_2N$ is preferably 80% or more by weight and less than 90% by weight of CrN and $Cr_2N$, and, more preferably, 90% or more by weight and less than 95% by weight of CrN and $Cr_2N$. When the proportion of $Cr_2N$ in CrN and $Cr_2N$ is 90% or more by weight and less than 95% by weight of CrN and $Cr_2N$, $Cr_2N$, which has semiconductor-like properties, makes the decrease of TCR (negative TCR) more noticeable. Furthermore, reduced use of ceramic materials enables the reduction of brittle fracture as well.

Meanwhile, when a small amount of $N_2$ or atomic N gets mixed or is present in the film, the external environment (for example, high temperature environment) might make them escape from the film, which might result in a change in the film stress. By creating a chemically stable CrN, a stable strain gauge can be obtained without generating the above unstable N.

The conductive traces 40 are formed on the substrate 10 and electrically connected with the resistor 30 and the electrodes 50. The conductive traces 40 are not limited to a straight line, and can be formed in any pattern. Also, the conductive trace 40 can have any width and length. Note that, in FIG. 1, the conductive trace 40 and the electrodes 50 are shown with a satin pattern that is thinner than the resistor 30 for ease of explanation.

The electrodes 50 are formed on the substrate 10 and electrically connected with the resistor 30 via the conductive traces 40. For example, the electrodes 50 are formed wider than the conductive traces 40 and formed in a substantially rectangular shape. In the examples of FIG. 1 to FIG. 3, the electrodes 50 are arranged on respective sides of the resistor 30 in the direction orthogonal to the strain direction E (grid direction). The electrodes 50 are a pair of electrodes for outputting strain-induced changes in the resistance value of the resistor 30 to the outside, and, for example, lead wires or the like for external connection are joined thereto.

Note that the resistor 30, the conductive traces 40, and the electrodes 50 are assigned different reference signs for ease of explanation, but they can be formed integrally from the same material in the same process. Therefore, the resistor 30, the conductive traces 40, and the electrodes 50 have substantially the same thickness.

A conductive layer formed from a material having a lower resistance than the resistor 30 may be laminated over the conductive traces 40 and the electrodes 50. The material of the conductive layer to be laminated is not particularly limited as long as it has a lower resistance than the resistor 30, and can be selected as appropriate, depending on the purpose of use. For example, when the resistor 30 is a Cr composite film, the material of the conductive layer to be laminated may be Cu, Ni, Al, Ag, Au, or Pt, an alloy of any of these metals, a compound of any of these metals, or a laminated film obtained by appropriately laminating any of these metals, alloys, or compounds. The thickness of the conductive layer is not particularly limited, and can be selected as appropriate depending on the purpose of use. For example, the conductive layer may be 3 μm to 5 μm thick.

In this way, when a conductive layer formed from a material having a lower resistance than the resistor 30 is laminated over the conductive traces 40 and the electrodes 50, the conductive traces 40 has a lower resistance than the resistor 30. This can prevent the conductive traces 40 from functioning as a resistor. As a result of this, the accuracy of strain detection by the resistor 30 can be improved.

In other words, by providing conductive traces 40 having a lower resistance than the resistor 30, it is possible to confine the part of the strain gauge 1 that practically serves as a sensing part within the specific part where the resistor 30 is formed. Therefore, the accuracy of strain detection by the resistor 30 can be improved.

In particular, in a highly sensitive strain gauge that uses a Cr composite film as the resistor 30 and that has a gauge factor of 10 or greater, making the resistance of the conductive traces 40 lower than that of the resistor 30 and confining the part of the strain gauge 1 that practically serves as a sensing part within the specific part where the resistor 30 is formed bring about a remarkable effect of improving the accuracy of strain detection. Furthermore, making the resistance of the conductive traces 40 lower than that of the resistor 30 also provides an effect of reducing lateral sensitivity.

A cover layer 60 is formed over the substrate 10 and covers the resistor 30 and conductive traces 40 and exposes the electrodes 50. Part of the conductive traces 40 may be exposed through cover layer 60. By providing a cover layer 60 that covers the resistor 30 and the conductive traces 40, the resistor 30 and the conductive traces 40 can be prevented from, for example, getting mechanically damaged. Further, by providing the cover layer 60, the resistor 30 and the conductive trace 40 can be protected from moisture and the like. Note that the cover layer 60 may be provided such that it covers the entirety of the resistor 30 and the conductive traces 40, except for the electrodes 50.

The cover layer 60 can be formed from an insulating resin such as a PI resin, an epoxy resin, a PEEK resin, a PEN resin, a PET resin, a PPS resin, or a composite resin (for example, a silicone resin or a polyolefin resin). The cover layer 60 may contain fillers or pigments. The thickness of the cover layer 60 is not particularly limited and can be selected in accordance with the purpose of use, and may be, for example, approximately 2 μm to 30 μm.

[Strain limit] The strain gauge 1 is attached to the measurement object through the strain generating body or attached directly to the measurement without the strain generating body, and detects the strain of the measurement object. To enable the strain gauge 1 to detect a larger amount of strain, it is preferable to improve the strain limit (strain resistance) as much as possible because the resistor 30 itself must not be damaged (must not have wire breaks, for example) during the process of expansion and contraction. Note that the strain limit refers to the value of mechanical strain at which cracks, wire breaks, and so forth start occurring when strain is applied to the strain gauge.

An intensive study by the present inventors has found out that, when the strain gauge 1 structured as shown in FIG. 1 to FIG. 3 is attached to the measurement object, the strain limit of the strain gauge 1 varies significantly depending the position of the resistor 30 in the grid direction with respect to the strain direction of the measurement object. Note that, in the above study, a 25 μm-thick polyimide resin film was used as the substrate 10 of the strain gauge 1. Also, for the resistor 30, a Cr composite film was used.

To be more specific, the present inventors prepared multiple samples in which the strain gauge 1 was attached to the measurement object such that the grid direction of the resistor 30 was orthogonal to the strain direction E (the direction of expansion/contraction) of the measurement object, as shown in FIG. 1. Then, strain was applied to each sample to examine the occurrence of cracks, wire breaks, and so forth, and the strain limit was measured. As a result, in the arrangement shown in FIG. 1, the strain limit of each sample was 10,900 microstrain (με) or greater.

Figure 4:
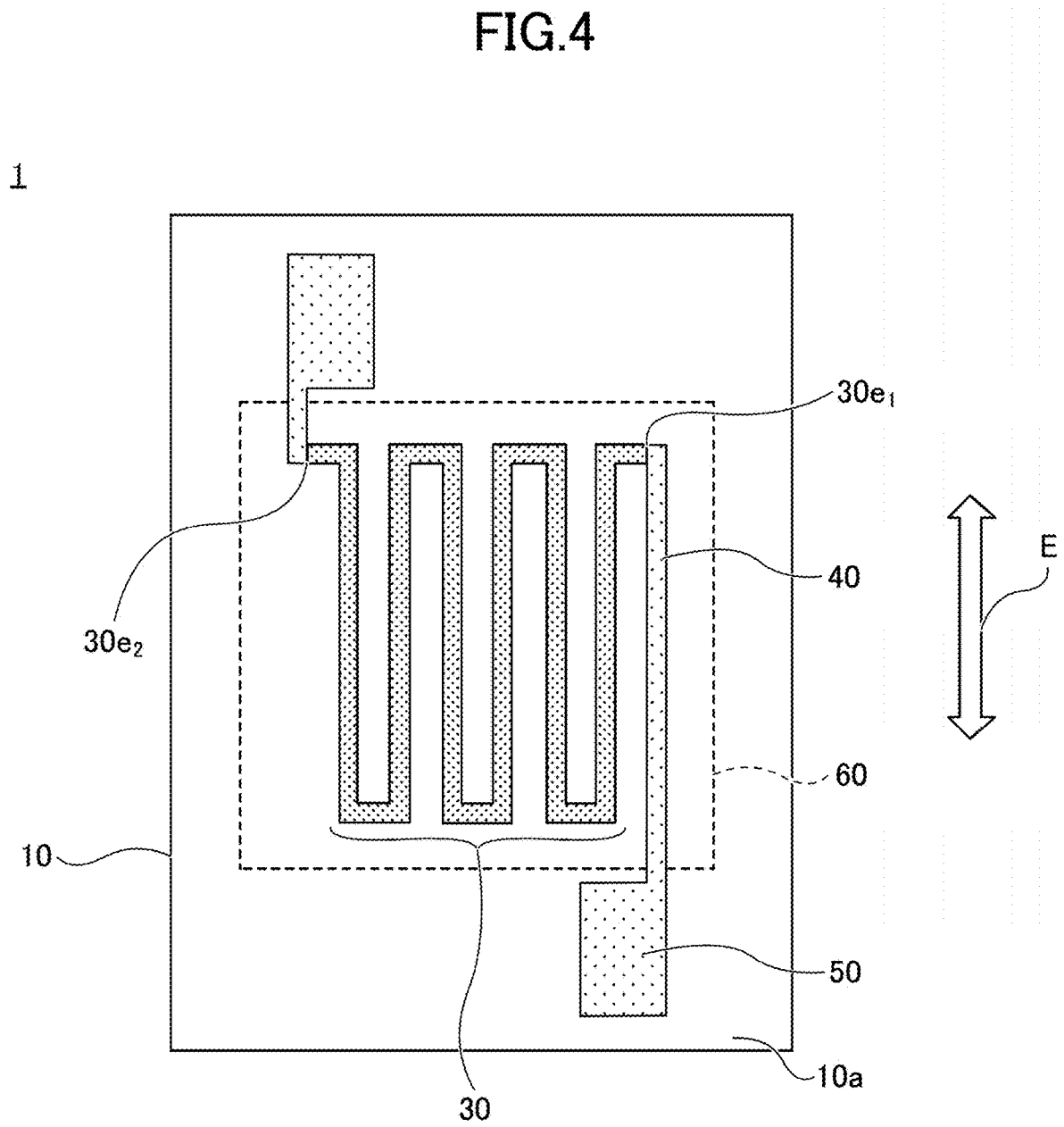
FIG. 4 is a diagram (example 1) for explaining the direction in which the strain gauge is attached.

On the other hand, to provide a comparative example, the present inventors prepared samples in which the strain gauge 1 was attached to the measurement object such that the grid direction of the resistor 30 was parallel to the strain direction E of the measurement object, as shown in FIG. 4. Then, strain was applied to each sample to examine the occurrence of cracks and wire breaks, and the strain limit was measured. As a result, in the arrangement shown in FIG. 4, the strain limit of each sample was 2,300με or greater.

In other words, by attaching the strain gauge 1 to the measurement object such that the grid direction of the resistor 30 is orthogonal to the strain direction E of the measurement object, the strain limit can be improved by more than 4 times compared to the case in which the strain gauge 1 is attached to the measurement object such that the grid direction of the resistor 30 is parallel to the strain direction E of the measurement object. Note that, when the strain gauge 1 is actually used, a strain limit of approximately 5,000με or greater is required.

In this way, by attaching the strain gauge 1 to the measurement object such that the grid direction of the resistor 30 is orthogonal to the strain direction E of the measurement object, even if the measurement object expands and contracts in the strain direction E, the resistor 30 might be affected little by the expansion and contraction. In other words, the substrate 10 has a characteristic that it is difficult to expand and contract in the longitudinal direction and easy to expand and contract in the lateral direction. As shown in FIG. 1, when the grid direction of the resistor 30 (the longitudinal direction of the substrate 10) is orthogonal to the strain direction E, the substrate 10 expands and contracts in the lateral direction of the substrate 10, in which it is easy to expand and contract. On the other hand, as shown in FIG. 4, when the grid direction of the resistor 30 (the longitudinal direction of the substrate 10) is parallel to the strain direction E, the substrate 10 expands and contracts in the longitudinal direction of the substrate 10, in which it is difficult to expand and contract. In this case, the substrate 10 cannot follow the expansion and contraction, and it is likely that the substrate 10 gets damaged and the resistor 30 has wire breaks accompanying the breakage of the substrate 10, and so forth.

[Method of Making Strain Gauge]

Here, the method of making the strain gauge 1 will be described. In order to make the strain gauge 1, first, a substrate 10 is prepared, and a metal layer (hereinafter referred to as "metal layer A" for ease of explanation) is formed over the upper surface 10*a* of the substrate 10. The metal layer A is a layer that is finally patterned to serve as the resistor 30, conductive traces 40, and electrodes 50. Therefore, the material and thickness of the metal layer A are the same as those of the resistor 30, conductive traces 40, and electrodes 50 described above.

The metal layer A can be formed, for example, by magnetron sputtering, in which a raw material that can form the metal layer A is used as a target. The metal layer A may be formed by using reactive sputtering, vapor deposition, arc ion plating, pulse laser deposition, and so forth, instead of magnetron sputtering.

From the perspective of achieving stable gauge characteristics, before forming the metal layer A, it is preferable to vacuum-form a functional layer of a predetermined thickness as an foundation layer, over the upper surface 10*a* of the substrate 10 by, for example, conventional sputtering.

In the present disclosure, a functional layer refers to a layer having a function of facilitating the crystal growth of at least the upper metal layer A (resistor 30). The functional layer preferably further has a function of preventing oxidation of the metal layer A due to the oxygen and moisture contained in the substrate 10, a function of improving the adhesion between the substrate 10 and the metal layer A, and so forth. The functional layer may also have other functions as well.

The insulating resin film that constitutes the substrate 10 contains oxygen and moisture. In particular, when the metal layer A contains Cr, Cr forms a self-autoxidized film, and so it is effective if the functional layer has a function of preventing oxidation of the metal layer A.

The material of the functional layer is not particularly limited as long as it at least has a function of facilitating the crystal growth of the metal layer A (resistor 30), which is an upper layer, and can be selected as appropriate depending on the purpose of use. The material may be, for example, one or more types of metals selected from the group consisting of Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum), an alloy of some of the metals in this group, or a compound of some of the metals in this group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

When the functional layer is formed from a conductive material such as a metal or an alloy, the film thickness of the functional layer is preferably $1/20$ or less of the film thickness of the resistor. When the film thickness of the functional layer is in this range, it is possible to facilitate the crystal growth of α-Cr, and prevent a situation where part of the current flowing in the resistor flows into the functional layer and causes a decrease in the sensitivity of strain detection.

When the functional layer is formed from a conductive material such as a metal or an alloy, the film thickness of the functional layer is more preferably $1/50$ or less of the film thickness of the resistor. When the film thickness of the functional layer is in this range, it is possible to facilitate the crystal growth of α-Cr, and prevent, more effectively, a situation where part of the current flowing in the resistor flows into the functional layer and causes a decrease in the sensitivity of strain detection.

When the functional layer is formed from a conductive material such as a metal or an alloy, the film thickness of the functional layer is even more preferably $1/100$ or less of the film thickness of the resistor. When the film thickness of the functional layer is in this range, it is possible to prevent, even more effectively, a situation where part of the current flowing in the resistor flows into the functional layer and causes a decrease in the sensitivity of strain detection.

When the functional layer is formed from an insulating material such as an oxide or a nitride, the film thickness of the functional layer is preferably 1 nm to 1 μm. When the film thickness of the functional layer is in this range, it is possible to facilitate the crystal growth of α-Cr, and form a film with ease without forming cracks in the functional layer. When the functional layer is formed from an insulating material such as an oxide or a nitride, the film thickness of the functional layer is more preferably 1 nm to 0.8 μm. When the film thickness of the functional layer is in this range, it is possible to facilitate the crystal growth of α-Cr, and form a film even more easily without forming cracks in the functional layer.

When the functional layer is formed from an insulating material such as an oxide or a nitride, the film thickness of the functional layer is even more preferably 1 nm to 0.5 μm. When the film thickness of the functional layer is in this range, it is possible to facilitate the crystal growth of α-Cr, and form a film even more easily without forming cracks in the functional layer.

Note that the plan shape of the functional layer is patterned substantially the same as the plan shape of the resistor illustrated in FIG. 1, for example. However, the plan shape of the functional layer does not necessarily have to be substantially the same as the plan shape of the resistor. When the functional layer is formed from an insulating material, the plan shape of the functional layer does not have to be patterned in the same shape as the plan shape of the resistor. In this case, the functional layer may at least in the part where the be formed solidly resistor is formed. Alternatively, the functional layer may be formed solidly over the entire upper surface of the substrate 10.

Also, when the functional layer is formed from an insulating material, the functional layer may be made relatively thick, such as 50 nm thick or more and 1 μm thick or less, and may be formed in a solid shape, so that the thickness and the surface area of the functional layer increase, and the heat that is generated by the resistor can be readily dissipated to the substrate 10 side. As a result of this, with the strain gauge 1, it is possible to reduce the decrease of the accuracy of measurement due to the resistor's self-heating.

The functional layer can be vacuum-formed by, for example, conventional sputtering, in which a raw material that can form the functional layer is the target and an Ar (argon) gas is introduced into a chamber. By using conventional sputtering, the functional layer is formed while the upper surface 10a of the substrate 10 is being etched with Ar, and therefore it is possible to form the functional layer only in a minimal amount, and achieve an effect of improving adhesion.

However, this is simply one example method of forming the functional layer, and the functional layer may be formed by using other methods as well. For example, a method may be used here in which, before the functional layer is formed, the upper surface 10a of the substrate 10 is activated by plasma treatment using Ar or the like, so as to gain an adhesion improving effect, and in which, subsequently, the functional layer is vacuum-formed by magnetron sputtering.

The combination of the material of the functional layer and the material of the metal layer A is not particularly limited, and can be selected as appropriate depending on the purpose of use. For example, it is possible to form a Cr composite film by using Ti for the functional layer and $\alpha$-Cr (alpha-chromium) as the main component of the metal layer A.

In this case, the metal layer A can be formed by magnetron sputtering, in which a raw material that can form the Cr composite film is the target and an Ar gas is introduced into a chamber. Alternatively, reactive sputtering, which targets pure Cr and introduces an appropriate amount of nitrogen gas into a chamber with an Ar gas, may be used to form the metal layer A. In this case, by changing the amount of nitrogen gas to be introduced, its pressure (nitrogen partial pressure) and so forth, and by adjusting the heating temperature by providing a heating step, it becomes possible to adjust the proportions of CrN and $Cr_2N$ contained in the Cr composite film, as well as the proportion of $Cr_2N$ in CrN and $Cr_2N$.

According to these methods, the growth surface of the Cr composite film is defined, triggered by a functional layer made of Ti, and a Cr composite film, in which $\alpha$-Cr having a stable crystalline structure is the main component, can be formed. Also, Ti that constitutes the functional layer is diffused in the Cr composite film, so that improved gauge characteristics can be gained. For example, the gauge factor of the strain gauge 1 can be made 10 or greater, and the gauge factor temperature coefficient TCS and the resistance temperature coefficient TCR can be kept in the range of −1,000 ppm/degrees Celsius to +1,000 ppm/degrees Celsius. Note that, when the functional layer is formed from Ti, the Cr composite film might contain Ti or TiN (titanium nitride).

Note that, when the metal layer A is a Cr composite film, the functional layer made of Ti has all of the function of facilitating the crystal growth of the metal layer A, the function of preventing oxidation of the metal layer A due to the oxygen or moisture contained in the substrate 10, and the function of improving the adhesion between the substrate 10 and the metal layer A. The same applies when Ta, Si, Al, or Fe is used for the functional layer, instead of Ti.

In this way, by providing a functional layer in a lower layer of the metal layer A, it becomes possible to facilitate the crystal growth of the metal layer A, and prepare a metal layer A that is made of a stable crystalline phase. As a result of this, the stability of gauge characteristics in the strain gauge 1 can be improved. Furthermore, since the material to constitute the functional layer is diffused in the metal layer A, the strain gauge 1 can have improved gauge characteristics.

Next, the metal layer A is patterned by photolithography, to form a resistor 30, conductive traces 40, and electrodes 50.

Subsequently, if necessary, a cover layer 60 is provided over the upper surface 10a of the substrate 10 to cover the resistor 30 and the conductive traces 40, and expose the electrodes 50, thereby completing the strain gauge 1. The cover layer 60 can be prepared, for example, by laminating a semi-cured thermosetting insulating resin film over the upper surface 10a of the substrate 10, so as to cover the resistor 30 and the conductive traces 40, and expose the electrodes 50, followed by curing by heating. The cover layer 60 may be prepared by coating the upper surface 10a of the substrate 10 with a liquid or paste thermosetting insulating resin so as to cover the resistor 30 and the conductive traces 40, and expose the electrodes 50, followed by curing by heating.

Figure 5:
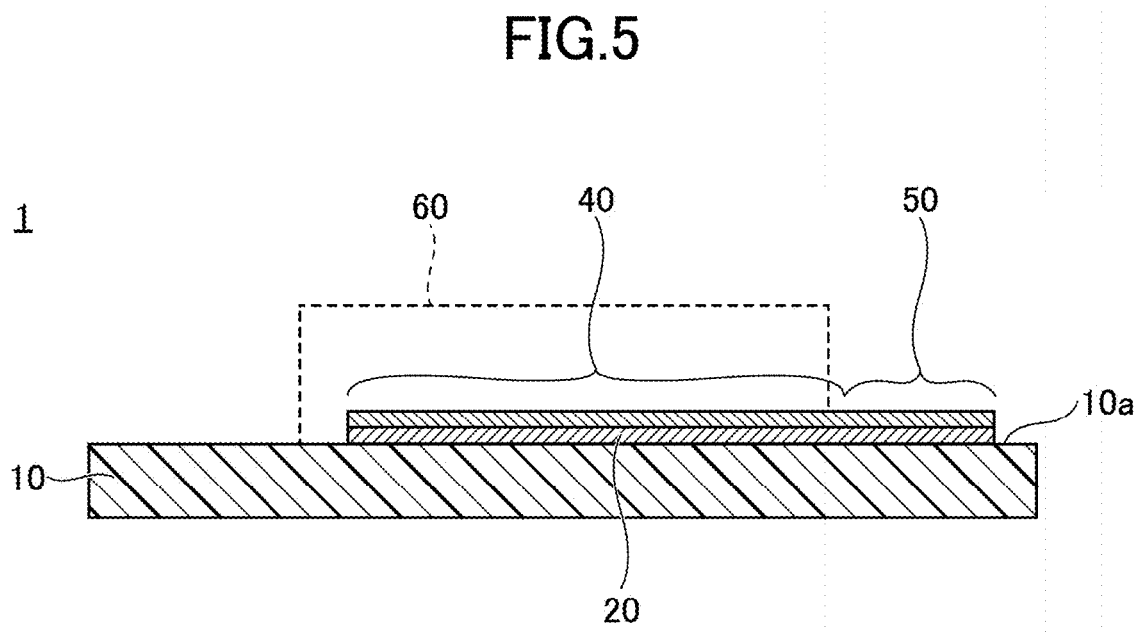
FIG. 5 is a cross-sectional view (example 3) that illustrates an example of the strain gauge according to the first embodiment.

Note that, when a functional layer is provided over the upper surface 10a of the substrate 10 as a foundation layer for the resistor 30, the conductive traces 40, and the electrodes 50, the strain gauge 1 has the cross-sectional shape shown in FIG. 5. The layer denoted by the reference sign 20 is the functional layer. The plan shape of the strain gauge 1 when the functional layer 20 is provided is, for example, the same as that shown in FIG. 1. However, as described above, the functional layer 20 may in some cases be formed solidly in part or all of the upper surface 10a of the substrate 10.

Modification of First Embodiment

With a modification of the first embodiment, an example of a strain gauge in which, for example, the conductive traces are routed differently and the electrodes are arranged differently will be described. Note that, in the modification of the first embodiment, description of components that are the same as those of the embodiment described earlier may be omitted.

Figure 6:
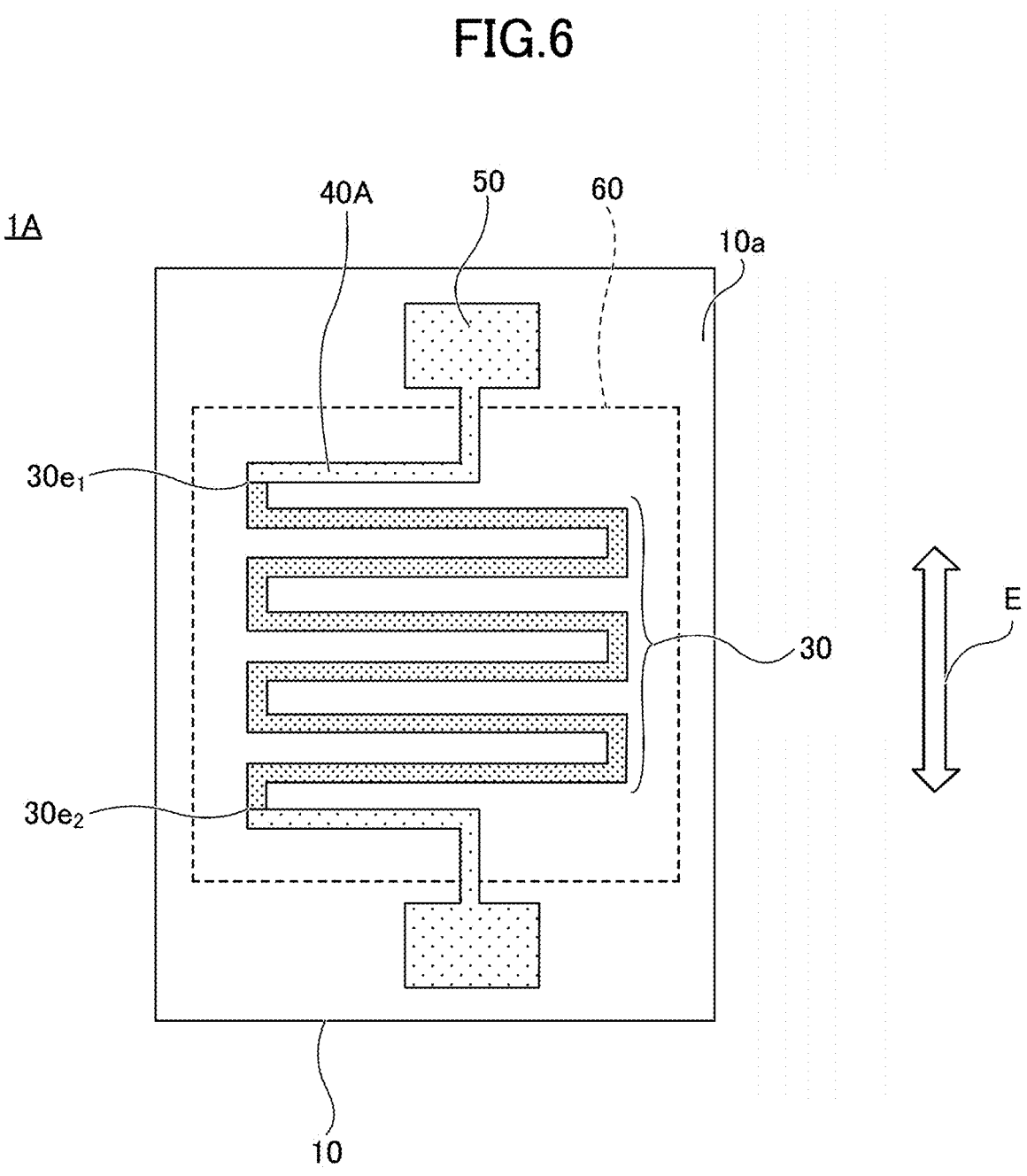
FIG. 6 is a plan view that illustrates an example of a strain gauge according to a first modification of the first embodiment.

FIG. 6 is a plan view that illustrates a strain gauge according to a modification 1 of the first embodiment. Referring to FIG. 6, a strain gauge 1A, like the strain gauge 1, is attached to a measurement object such that the grid direction of the resistor 30 is orthogonal to the strain direction E of the measurement object. However, the routing of the conductive traces 40A and the arrangement of the electrodes 50 are different from the strain gauge 1 (see FIG. 1 to FIG. 3, etc.).

In the strain gauge 1A, unlike the conductive traces 40, each conductive trace 40A has one bent part, and includes a part that extends perpendicularly with respect to the grid direction of the resistor 30. However, the perpendicular direction here is by no means a limitation, and the conductive traces 40A may include a part that is inclined relative to the grid direction of the resistor 30. In the strain gauge 1A, the electrodes 50 are arranged on respective sides of the resistor 30 in the strain direction E. Note that a case in which the conductive traces 40A include a part that extends perpendicularly with respect to the grid direction of the resistor 30 is an example of a case in which the conductive traces 40A include a part that is inclined relative to the grid direction of the resistor 30 and the angle of inclination is 90 degrees. The same applies to other conductive traces as well.

When the present inventors investigated the strain limit of the strain gauge 1A by applying the same method as that for the strain gauge 1, each sample's strain limit was 7,200µε or greater in the arrangement shown in FIG. 6. The resulting values were significantly better than those obtained from the arrangement of FIG. 4 (2,300με or greater), and are good enough to withstand practical use; nevertheless these values are not as good as the values obtained from the arrangement of FIG. 1 (10,900με or greater).

In the arrangement shown in FIG. 6, the strain gauge 1A is attached to the measurement object such that the grid direction of the resistor 30 is orthogonal to the strain direction E of the measurement object. Consequently, although, when the measurement object expands or contracts in the strain direction E, the resistor 30 is affected little by the expansion and contraction; still, the resistor 30 is affected by the stress of the electrodes 50.

That is, when the measurement object expands and contracts in the strain direction E, stress in the strain direction E is produced in the electrodes 50. Given the arrangement of FIG. 6, in which the electrodes 50 are arranged on respective sides of the resistor 30 in the strain direction E, it is likely that the stress produced in the electrodes 50 was transmitted linearly to the resistor 30 and lowered the strain limit of the resistor 30. On the other hand, in the arrangement shown in FIG. 1, in which the electrodes 50 are arranged on respective sides of the resistor 30 in the direction orthogonal to the strain direction E, it is likely that the resistor 30 is less affected by the stress from the electrodes 50 and therefore has a higher strain limit than in the arrangement of FIG. 6.

Figure 7:
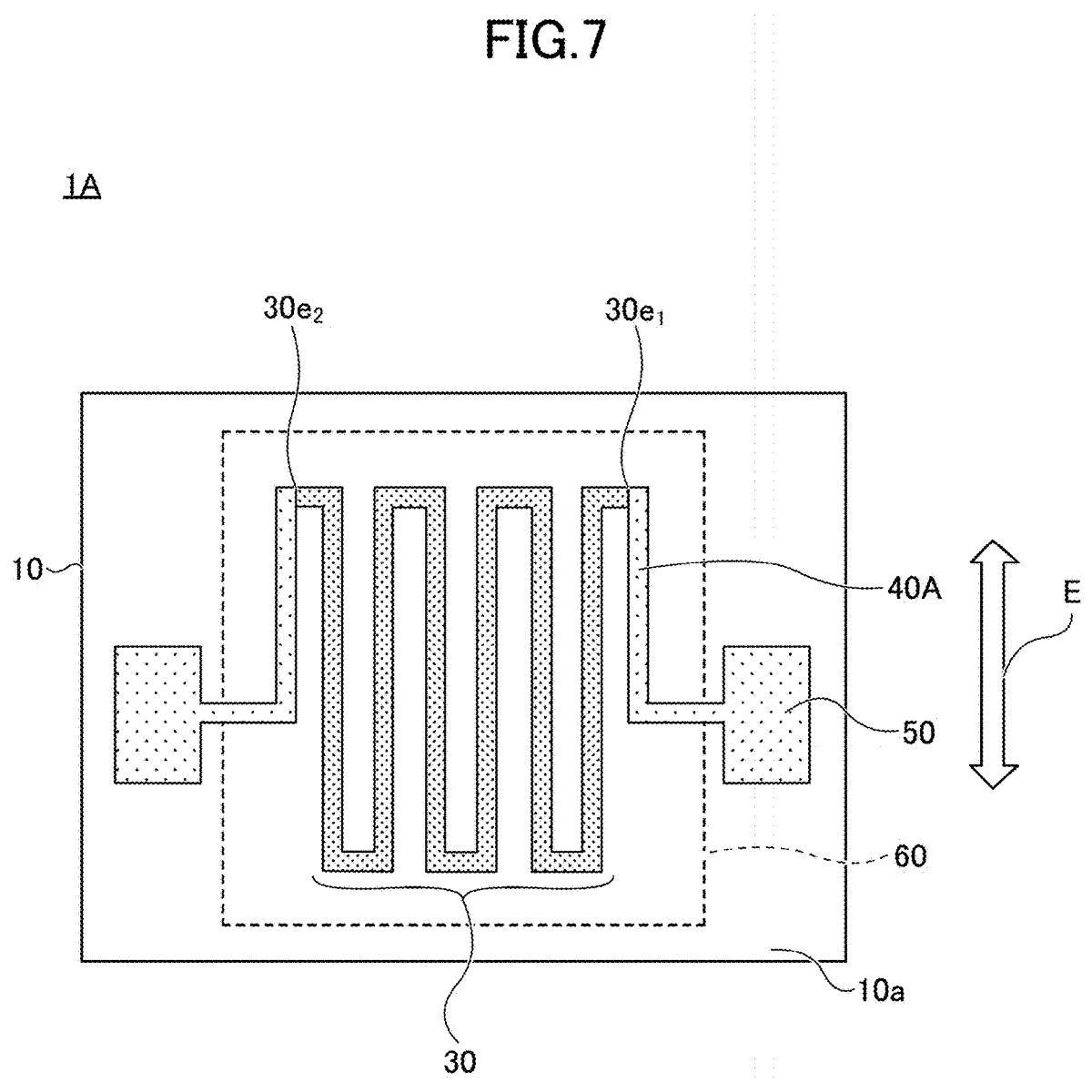

Also, according to the present inventors' study, in the arrangement shown in FIG. 7, each sample had a strain limit greater than or equal to 6,900με. The resulting values are slightly lower than the values obtained from the arrangement shown in FIG. 6 (7,200 pa or greater), but are substantially the same values, and good enough to withstand practical use.

The arrangement of FIG. 7 is disadvantageous over the arrangement of FIG. 6 in that the grid direction of the resistor 30 is parallel to the strain direction E. However, since the electrodes 50 are arranged on respective sides of the resistor 30 in a direction that is orthogonal to the strain direction E, it is likely that the fact that the resistor 30 is affected less by the stress from the electrodes 50 worked advantageously, and the result was obtained accordingly.

Figure 8:
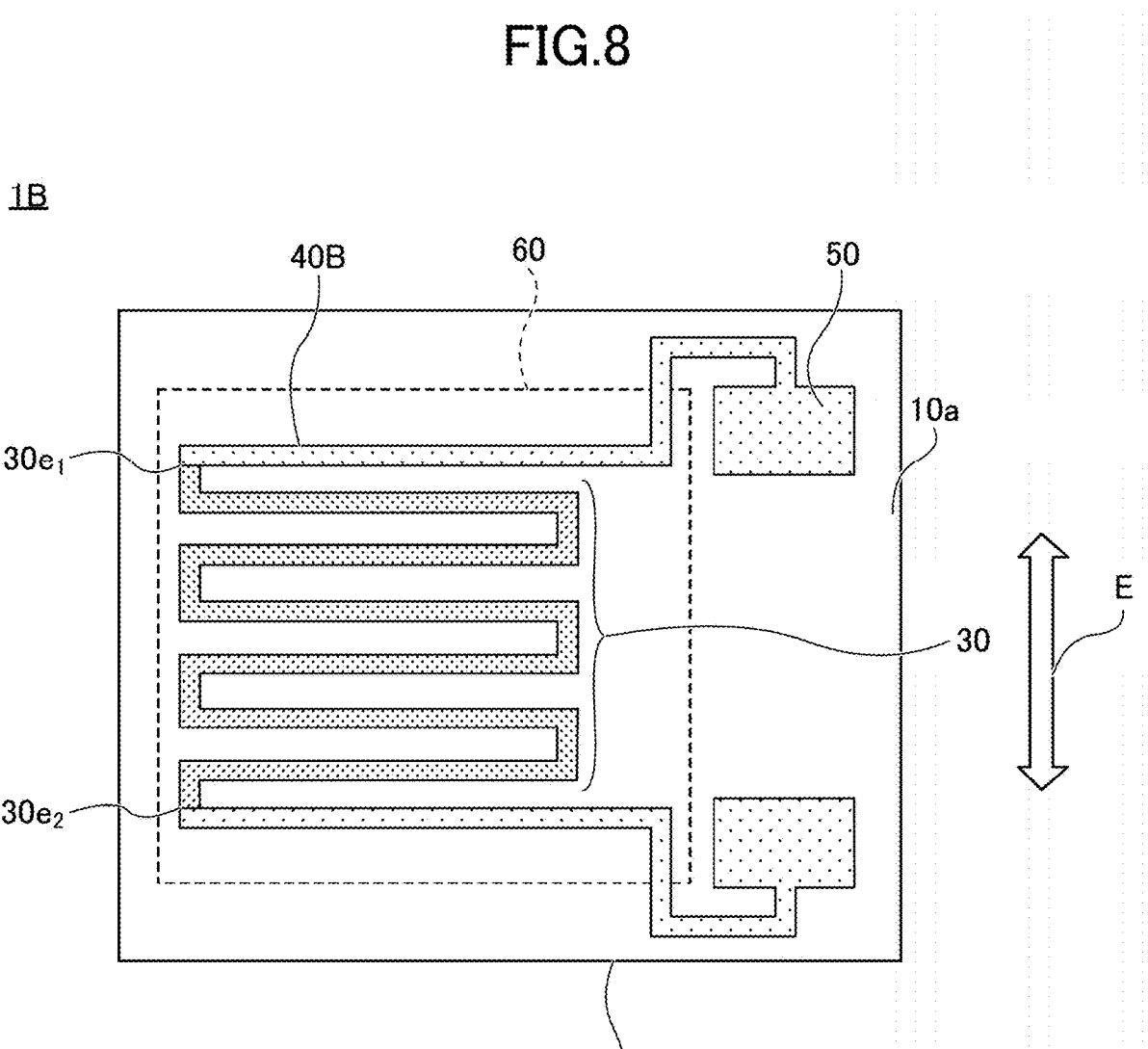
FIG. 8 is a plan view (example 1) that illustrates an example of a strain gauge according to a second modification of the first embodiment.
Figure 9:
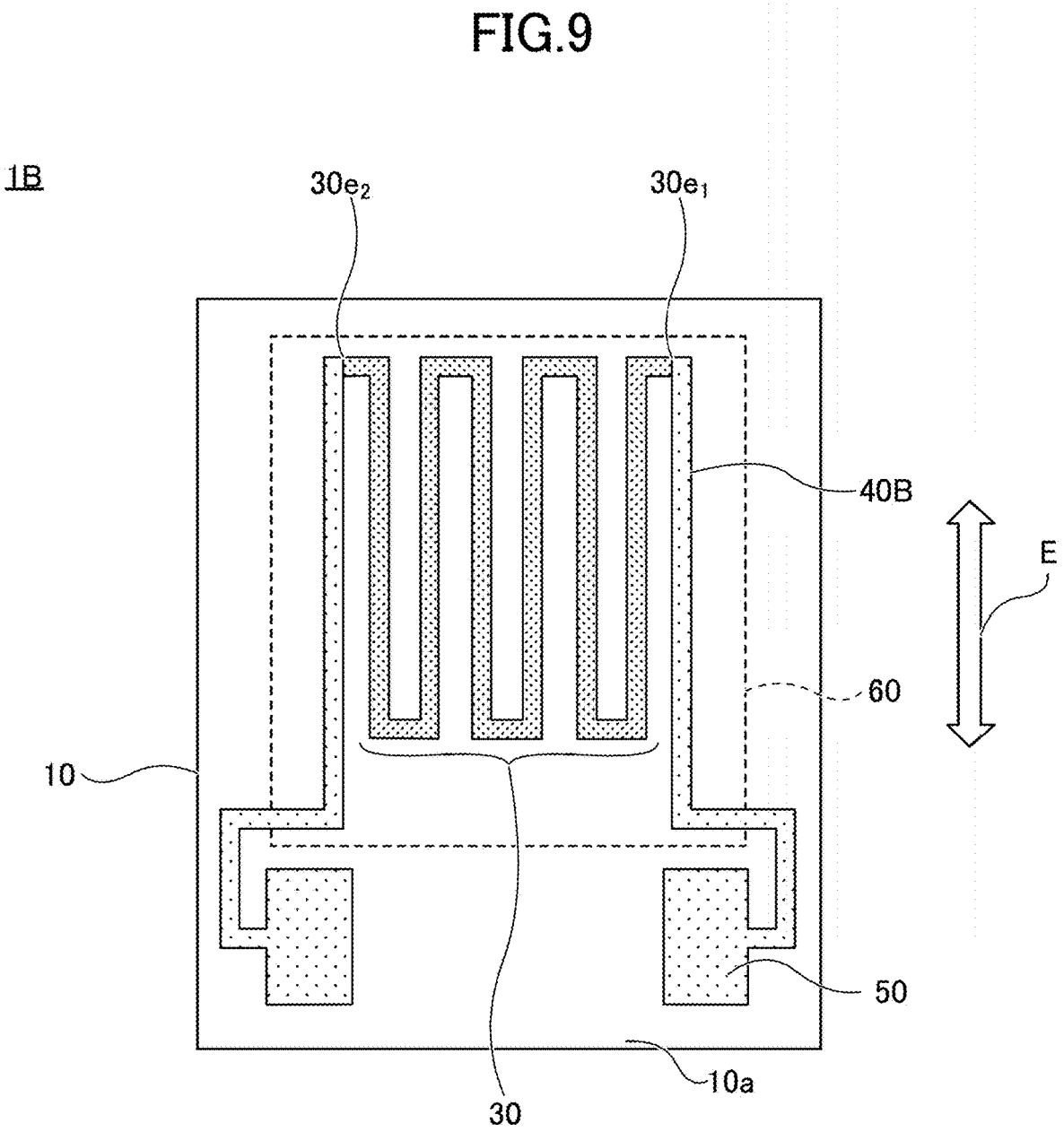
FIG. 9 is a plan view (example 2) that illustrates an example of the strain gauge according to the second modification of the first embodiment.

Note that the conductive traces 40B may be routed and the electrodes 50 may be arranged as in the strain gauges 1B shown in FIG. 8 and FIG. 9. When the strain gauge 1B is arranged as shown in FIG. 8, a strain limit comparable to that when the strain gauge 1 is arranged as shown in FIG. 1 can be achieved. Also, when the strain gauge 1B is arranged as shown in FIG. 9, a strain limit comparable to that when the strain gauge 1A is arranged as shown in FIG. 7 can be achieved.

Note that conductive traces 40B of the strain gauge 1B each have three bent parts. That is, each conductive trace 40B has, in the part connected with an electrode 50, a weaving part in which the conductive trace 40B bends away from the resistor 30, extends parallel to the resistor 30, and bends toward the resistor 30. Because this weaving part works like a spring, the stress produced in the electrodes 50 is mitigated and transmitted less to the resistor 30, which is advantageous in improving the strain limit. Note that the weaving part may be formed with four or more bent parts, and in that case too they work like a spring. Also, the conductive traces 40B may include a part that is inclined relative to the grid direction of the resistor 30.

Although a preferred embodiment has been described above, the embodiment and other examples described above are by no means limiting, and various alterations and replacements may be made to the embodiment and examples herein without departing from the scope of the claims attached herewith.

This international application claims priority to Japanese Patent Application No. 2021-095633, filed Jun. 8, 2021, the entire contents of which are incorporated herein by reference.

REFERENCE SIGNS LIST

1, 1A, 1B strain gauge
10 substrate
10*a* upper surface
20 functional layer
30 resistor
30*e*$_1$, 30*e*$_2$ end
40, 40A, 40B conductive trace
50 electrode
60 cover layer

The invention claimed is:

1. A strain gauge comprising:
a flexible substrate;
a resistor formed of a film containing Cr, CrN, and Cr$_2$N, on the substrate; and
a pair of electrodes disposed on the substrate such that the resistor is interposed between the pair of electrodes, one of the pair of electrodes electrically connected with the resistor via a first conductive trace, and another one of the pair of electrodes electrically connected with the resistor via a second conductive trace,
wherein a longitudinal length of the first conductive trace is greater than a longitudinal length of the second conductive trace, and
wherein the strain gauge is attached to a measurement object such that a grid direction of the resistor is orthogonal to a strain direction of the measurement object.

2. The strain gauge according to claim 1,
wherein the electrodes are arranged on respective sides of the resistor in a direction orthogonal to the strain direction.

3. The strain gauge according to claim 1,
wherein the electrodes are arranged on respective sides of the resistor in the strain direction.

4. The strain gauge according to claim 2, wherein the conductive traces include a part that is inclined relative to the grid direction of the resistor.

5. The strain gauge according to claim 3, wherein the conductive traces include a part that extends perpendicularly to the grid direction of the resistor.

6. A strain gauge comprising:
a flexible substrate;
a resistor formed of a film containing Cr, CrN, and Cr$_2$N, on the substrate, the resistor including an elongated part extending in a grid direction of the resistor, the elongated part having a first side and a second side opposite to the first side; and
a pair of electrodes formed on the substrate and electrically connected with the resistor via conductive traces,
wherein each of the conductive traces includes a bent part that is inclined relative to the grid direction of the resistor, and
wherein the bent part is positioned between the first side and the second side of the elongated part of the resistor when viewed in a direction perpendicular to the grid direction of the resistor.

7. The strain gauge according to claim 6, wherein the bent part is inclined to be perpendicular to the grid direction of the resistor.

8. The strain gauge according to claim 6, wherein the strain gauge is attached to a measurement object such that the grid direction of the resistor is parallel to a strain direction of the measurement object.

9. The strain gauge according to claim 8, wherein the electrodes are arranged such that the resistor is interposed between the electrodes in a direction orthogonal to the strain direction.

10. The strain gauge according to claim 1, wherein a gauge factor is 10 or greater.

11. The strain gauge according to claim 1, wherein a proportion of CrN and $Cr_2N$ contained in the resistor is 20% or less by weight of the resistor.

12. The strain gauge according to claim 1, wherein a proportion of the $Cr_2N$ in the CrN and the $Cr_2N$ is 80% or more by weight and less than 90% by weight of the CrN and the $Cr_2N$.

13. A strain gauge comprising:

a flexible substrate;

a resistor formed of a film containing Cr, CrN, and $Cr_2N$, the resistor disposed on the substrate; and a pair of electrodes disposed on the substrate and electrically connected with the resistor via conductive traces, wherein each of the conductive traces includes a first bent part extending away from the resistor, a second bent part extending to contact each of the pair of electrodes, and a third bent part connecting the first bent part and the second bent part, the first bent part and the second bent part extending parallel to each other.

14. The strain gauge according to claim 13, wherein the first bent part, the second bent part, and the third bent part of each of the conductive traces form a weaving pattern.

* * * * *